(12) United States Patent
Hegerty et al.

(10) Patent No.: US 10,303,731 B2
(45) Date of Patent: *May 28, 2019

(54) SOCIAL-BASED SPELLING CORRECTION FOR ONLINE SOCIAL NETWORKS

(71) Applicant: Facebook, Inc., Menlo Park, CA (US)

(72) Inventors: Ian Douglas Hegerty, Andover (GB); Daniel Bernhardt, London (GB); Feng Liang, London (GB); Agnieszka Anna Podsiadlo, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,741

(22) Filed: May 1, 2017

(65) Prior Publication Data
US 2017/0235842 A1    Aug. 17, 2017

Related U.S. Application Data

(63) Continuation of application No. 14/556,368, filed on Dec. 1, 2014, now Pat. No. 9,679,024.

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/248* (2019.01); *G06F 16/2455* (2019.01); *G06F 16/338* (2019.01); *G06F 16/3344* (2019.01); *G06F 17/273* (2013.01); *G06F 17/277* (2013.01)

(58) Field of Classification Search
CPC ........ G06F 17/30554; G06F 17/30477; G06F 17/273; G06F 17/30; G06F 17/28; G06F 17/277; G06F 17/30867; G06F 17/30861; G06F 17/3053; G06F 17/30684; G06F 17/30696; G06F 16/2455; G06F 16/3344; G06F 16/328; G06F 16/248;
(Continued)

(56) References Cited

U.S. PATENT DOCUMENTS 8,209,178 B1 *   6/2012   Talbot ................ G06F 17/2715
                                                     704/254
8,442,999 B2 *   5/2013   Gorelik ............. G06F 17/30292
                                                     707/688
(Continued)

*Primary Examiner* — Anh Ly
(74) *Attorney, Agent, or Firm* — Baker Botts L.L.P.

(57) ABSTRACT

In one embodiment, a method includes, receiving, from a client system of a user, a search query including n-grams. The method includes associating each n-gram with verticals based on an analysis of the n-grams by language models. The method includes determining, for each n-gram, if a bloom filter for a vertical associated with the n-gram indicates, based on sub-bloom filters of the bloom filter, the n-gram does exist or does not exist in a set of object names associated with the vertical. Each sub-bloom filter is associated with a subset of the set of object names and indicates the n-gram does exist or does not exist in its subset of object names. The method includes sending, to the client system, an indication that an n-gram of the n-grams is misspelled if a bloom filter indicates the n-gram does not exist in the set of object names associated with the vertical.

19 Claims, 7 Drawing Sheets

(51) Int. Cl.
*G06F 16/248* (2019.01)
*G06F 16/338* (2019.01)
*G06F 16/2455* (2019.01)
*G06F 16/33* (2019.01)
*G06F 17/27* (2006.01)

(58) Field of Classification Search
CPC ..... G06F 16/9535; G06F 16/00; G06Q 50/01; H04L 67/42; G06N 99/005; G06N 7/005
See application file for complete search history.

(56) References Cited

U.S. PATENT DOCUMENTS

| | | | | |
|---|---|---|---|---|
| 8,572,126 B2* | 10/2013 | Flor | ................. | G06F 17/30017 707/797 |
| 9,037,967 B1* | 5/2015 | Al-Jefri | ................. | G06F 17/273 715/257 |
| 9,361,327 B1* | 6/2016 | Chen, Jr. | ............. | G06F 17/3033 707/E17.014 |
| 2005/0120004 A1* | 6/2005 | Stata | ................. | G06F 17/30613 707/E17.083 |
| 2005/0198076 A1* | 9/2005 | Stata | ................. | G06F 17/30672 707/E17.004 |
| 2006/0167676 A1* | 7/2006 | Plumb | ................. | G06F 17/273 704/6 |
| 2009/0193293 A1* | 7/2009 | Stolfo | ................. | G06F 21/564 714/26 |
| 2012/0029910 A1* | 2/2012 | Medlock | ............... | G06F 3/0237 704/9 |
| 2013/0124538 A1* | 5/2013 | Lee | ........................ | H04L 63/105 707/749 |
| 2013/0191372 A1* | 7/2013 | Lee | ........................ | G06Q 10/10 707/722 |
| 2013/0191416 A1* | 7/2013 | Lee | .................... | G06F 16/24534 707/771 |
| 2014/0025702 A1* | 1/2014 | Curtiss | ................... | G06Q 50/01 707/769 |
| 2014/0297267 A1* | 10/2014 | Spencer | ................ | G06F 17/276 704/9 |
| 2014/0303960 A1* | 10/2014 | Orsini | ................. | G06F 17/2854 704/2 |
| 2014/0303961 A1* | 10/2014 | Leydon | ................... | G06F 17/28 704/2 |
| 2015/0193431 A1* | 7/2015 | Stoytchev | ............... | G06F 19/18 704/9 |
| 2015/0317069 A1* | 11/2015 | Clements | .............. | G06F 3/0237 715/773 |
| 2015/0317314 A1* | 11/2015 | Venkataraman | .... | G06F 17/3053 707/750 |
| 2015/0379430 A1* | 12/2015 | Dirac | ................... | G06N 99/005 706/12 |
| 2016/0098487 A1* | 4/2016 | Kim | .................. | G06F 17/30867 707/754 |
| 2016/0154861 A1* | 6/2016 | Hegerty | ............ | G06F 17/30554 707/728 |
| 2017/0185581 A1* | 6/2017 | Bojja | .................... | G06F 17/276 707/E17.044 |

* cited by examiner

SOCIAL-BASED SPELLING CORRECTION FOR ONLINE SOCIAL NETWORKS

PRIORITY

This application is a continuation under 35 U.S.C. § 120 of U.S. patent application Ser. No. 14/556,368, filed 1 Dec. 2014, issued as U.S. Pat. No. 9,679,024 on 13 Jun. 2017.

TECHNICAL FIELD

This disclosure generally relates to detecting and correcting misspelled search queries.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual users within the networks, and edges represent the relationships between the users. The resulting graph-based structures are often very complex. In its simplest form, a social graph is a map of all of the relevant edges between all the nodes being studied.

SUMMARY OF PARTICULAR EMBODIMENTS

In particular embodiments, one or more computing devices of a social-networking system may detect and correct one or more misspelled n-grams in a search query using a bloom filter and social-networking data. The search query may be associated with any object type such as, for example, users, groups, events, pages, or posts of the social-networking system. In particular embodiments, in addition to the bloom filter, the social-networking system may utilize a user-specific language model, a grammar model, an error-correction model, a context model based on social graph data with the social-networking system, or any suitable combination thereof, to detect and correct the misspelled n-grams in the search query.

In particular embodiments, utilizing the bloom filter to determine whether the search query has been misspelled allows the social-networking system to reduce the resources (for example, computing and/or storage hardware resources) for determining correctly spelled variants of the misspelled n-grams for retrieval of search results corresponding to a misspelled search query. In particular embodiments, the bloom filter may determine whether the n-grams of a search query corresponding to a username exist in a first set of object names in order to prevent spell-correcting a real but rare username. Furthermore, the bloom filter may determine whether the username could be associated with derived nicknames, alternative names, or alternate forms of the username associated with username n-grams from the first set of object names. In particular embodiments, the bloom filter may determine whether the n-grams of a search query corresponding to an entity exist in a second set of object names in order to prevent spell-correcting a real but rare entity.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
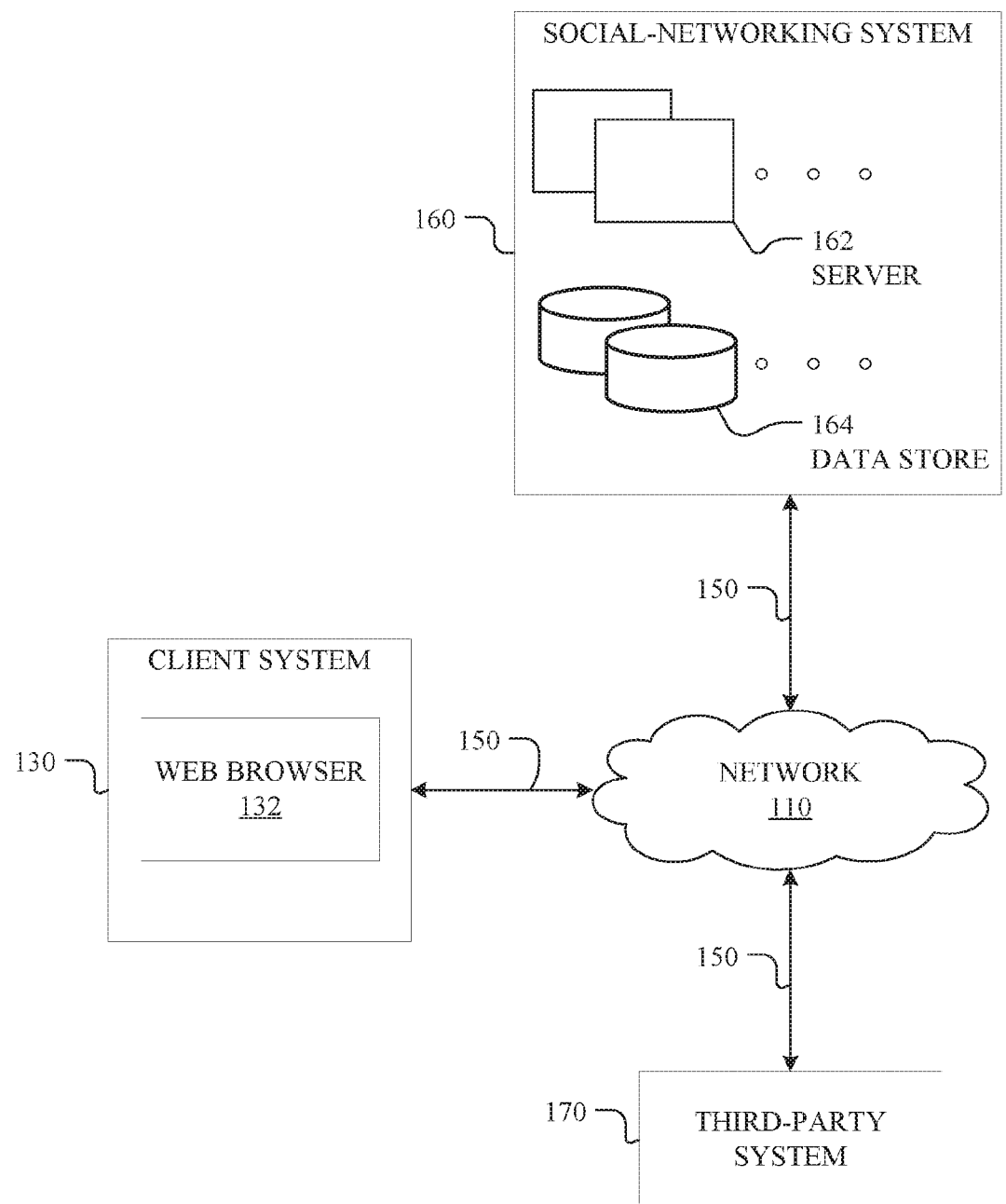
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
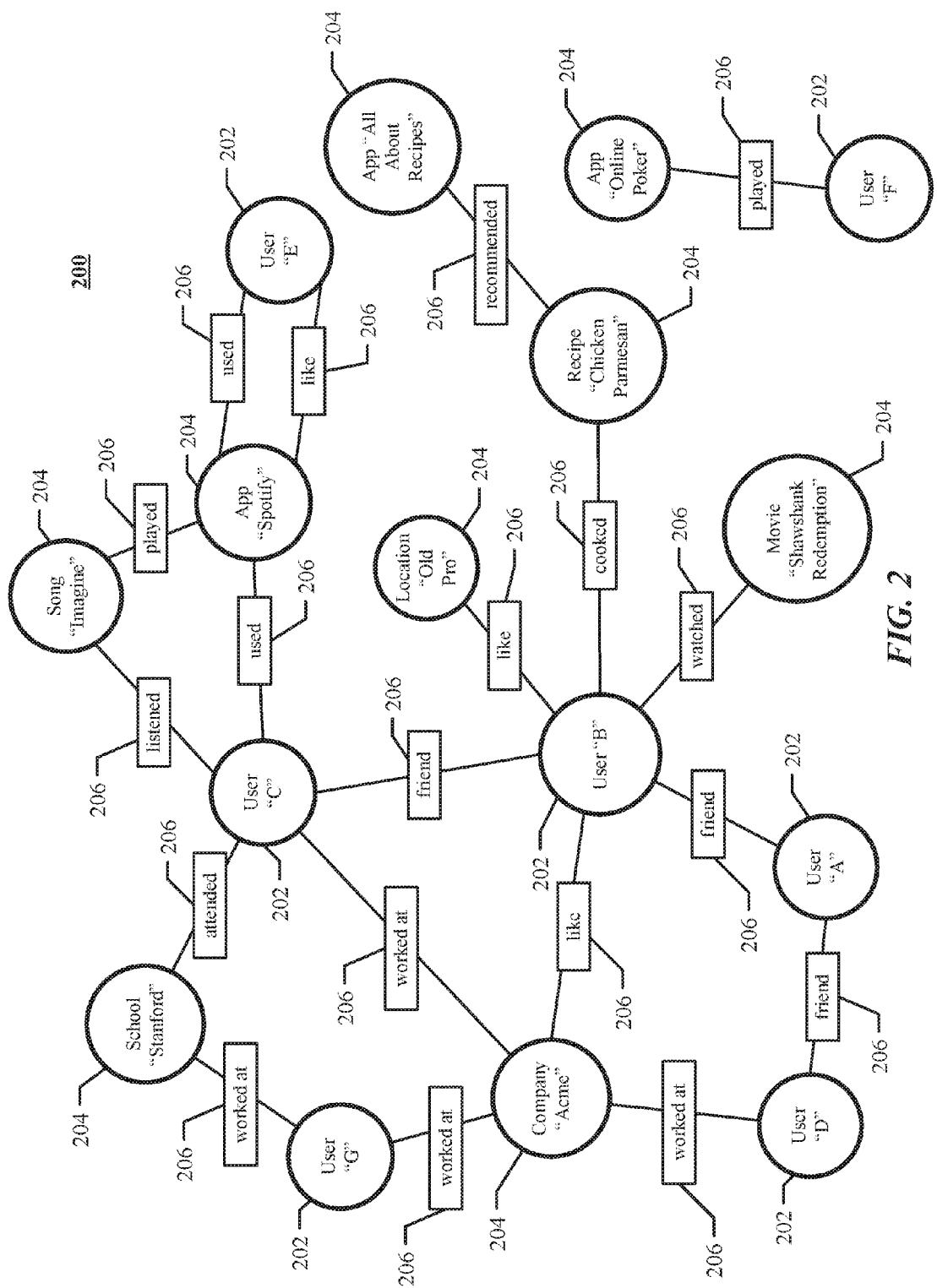
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Social-Based Spelling Correction

Figure 3:
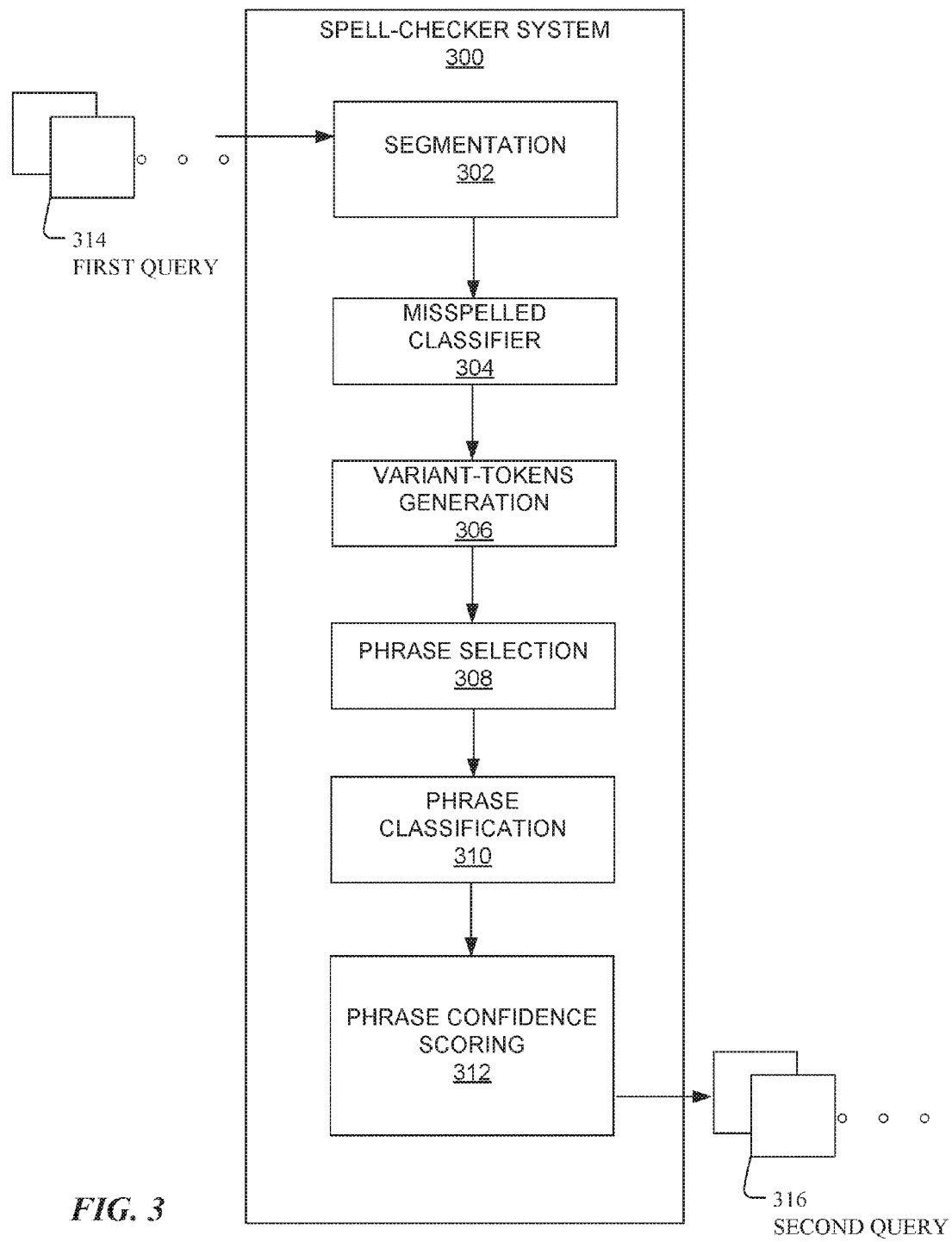
FIG. 3 illustrates an example spell-checker system.

FIG. 3 illustrates example spell-checker system 300. In particular embodiments, spell-checker system 300 may be associated with a search engine of social-networking system 160. The search engine may be used by a user of social-networking system 160 to search for information internal and/or external to social-networking system 160. As an example and not by way of limitation, the user may submit one or more search queries, via web browser 132, to the search engine of social-networking system 160. Furthermore, spell-checker system 300 may detect and correct one or more misspelled n-grams in a search query using at least a bloom filter and data from social-networking system 160. The data from social-networking system 160 may include, for example, social-graph information in one or more data stores 164, as discussed above. As an example and not by way of limitation, if a user inputs the query "mark zuckerverg," spell-checker system 300 may identify the n-gram "zuckerverg" as being misspelled because the term cannot be identified by a bloom filter associated with usernames of the online social network, and may correct this query to "mark zuckerberg." In particular embodiments, spell-checker system 300 may be used for typeahead processes. More information on typeahead processes may be found in U.S. patent application Ser. No. 12/763,162, filed 19 Apr. 2010, and U.S. patent application Ser. No. 13/556,072, filed 23 Jul. 2012, which are incorporated by reference. In particular embodiments, spell-checker system 300 may be used in querying any suitable user cases such as, for example, graph searching, keyword searching, and/or tagging. Although this disclosure describes particular examples of utilizing particular spell-checker systems of particular search engines, the disclosure contemplates utilizing any suitable spell-checker systems of any suitable search engines in any suitable manner.

In particular embodiments, spell-checker system 300 may take as an input first query 314 (i.e. a first search query) from the user of social-networking system 160, detect and correct one or more misspelled n-grams of first query 314 based on one or more of segmentation component 302, misspelled classifier component 304, variant-tokens generation component 306, phrase selection component 308, phrase classification component 310, and phrase confidence scoring component 312 of spell-checker system 300, and determine second query 316 (i.e. a second search query) based on one or more of the corrected n-grams. As an example and not by way of limitation, spell-checker system 300 may receive first query 314 sent from web browser 132 of client system 130. In particular embodiments, one or more components of the search engine may transform first query 314 into a form that is suitable for processing by spell-checker system 300. As an example and not by way of limitation, one or more n-grams of first query 314 may be transformed to lowercase, normalized to a pre-determined condition (for example, conforming to formal English), stemmed, mapped to a one or more phonetic representations (for example, International Phonetic Alphabet (IPA) or Extended Speech Assessment Methods Phonetic Alphabet (X-SAMPA), other suitable transformations, or any combination thereof). In particular embodiments, first query 314 may be associated with a vertical. The vertical associated with first query 314 may be a data store 164 of social-networking system 160, where the data store 164 includes one or more objects of an object-type of the expected search results of first query 314. As an example and not by way of limitation, a vertical may correspond to users of the online social network, and may be associated with an index of usernames (which may be used for user searches on social-networking system 160). As another example and not by way of limitation, a vertical may correspond to any suitable object-type, such as, for example, users, locations, companies, photos, groups, events, pages, or posts of social-networking system 160 (each of which may be represented by nodes of corresponding node-types within social graph 200). In particular embodiments, the vertical may correspond to objects from social-networking system 160. In particular embodiments, the vertical may correspond to objects external to social-networking system 160. More information on verticals and data stores of the online social network may be found in U.S. patent application Ser. No. 13/954,695, filed 30 Jul. 2013, which is incorporated by reference. Although this disclosure describes particular search query in particular manner, the disclosure contemplates any suitable search query in any suitable manner.

In particular embodiments, spell-checker system 300 may include segmentation component 302. Segmentation component 302 may take as input first query 314, parse the first query 314, and generate one or more n-grams based on the first query 314. As an example and not by way of limitation, referencing FIG. 4, segmentation component 302 may parse first query 314 and generate data 402 corresponding to $n\text{-gram}_1$, $n\text{-gram}_2$, and $n\text{-gram}_3$. In particular embodiments, an n-gram may be a contiguous sequence of n items from a given sequence of text or speech. The n items may be characters, phonemes, syllables, letters, words, base pairs, prefixes, or other identifiable items from the sequence of text or speech. The n-gram may comprise one or more characters of text (letters, numbers, punctuation, etc.) entered by the user. As an example and not by way of limitation, the n-gram may be a uni-gram (for example, a single text character or a single word), a bi-gram (for example, two text characters or two words), or a tri-gram (for example, three text characters or three words). Each n-gram may include one or more parts from the text query received from the querying user. Each n-gram may include a character string (for example, one or more characters of text) entered by the user. In particular embodiments, the user may search for information on social-networking system 160 relating to a particular subject matter. This information may be associated with users, concepts, external content, and/or resources of social-networking system 160. The user may provide one or more keywords or a short phrase as first query 314 on web browser 312, where the keywords or short phrase describes the subject matter. The keywords or short phrase may form a text query that includes one or more character strings. As discussed above, the character strings may include one or more n-grams. Thereafter, segmentation component 302 may segment the first query 314 into a plurality of n-grams, where each n-gram corresponds to a vertical associated with first query 314. As an example and not by way of limitation, a user may submit a first query 314 that searches for users. In response to the first query 314, segmentation component 302 may reference a vertical corresponding to usernames of social-networking system 160. In particular embodiments, segmentation component 302 may utilize a language model to examine whether the first query 314 includes a username. The language model may determine a probability of whether the first query 314 match terms associated with a particular language (for example, determining whether the first query 314 includes a first name, a last name, a middle name, or any suitable combinations thereof within a particular language). As an example and not by way of limitation, if the first query 314 includes a username, segmentation component 302 may segment the username into n-grams corresponding to, for example, first name, last name, and/or middle name. In particular embodiments, the language model may be based on a demographic of the querying user. The demographics of the querying user may define the particular language associated with the language model. As an example and not by way of limitation, if the querying user is of European descent and that first query 314 includes a username, a username language model may be associated with a European Language Portfolio. In particular embodiments, segmentation component 302 may send the generated n-grams to misspelled classifier component 304. As an example and not by way of limitation, referencing FIG. 4, segmentation component 302 may send data 402 corresponding to corresponding to $n\text{-gram}_1$, $n\text{-gram}_2$, and $n\text{-gram}_3$ to misspelled classifier component 304. Although this disclosure describes generating particular n-grams based on particular search query in a particular manner, this disclosure contemplates generating any suitable n-grams based on any suitable search query in any suitable manner.

In particular embodiments, first query 314 may be associated with one or more verticals. As such, the n-grams of first query 314 may be associated with the verticals, where each n-gram corresponds to a particular vertical. As an example and not by way of limitation, a first query 314 may be associated with a username and a city where the user lives such as, for example, string "Daniel Bernhardt London," where the n-gram "Daniel Bernhardt" is associated with a username of an object stored in a users vertical, and the n-gram "London" is associated with a city name of an object stored in a locations vertical. In other words, a first vertical of the first query 314 may be associated with usernames and a second vertical of the first query 314 may be associated with locations. Alternatively, a single vertical of the first query 314 may be associated with combinations of a username and an entity such as a city where the user lives (for example, continuing with the prior example, a single vertical may store both users and locations). As another example and not by way of limitation, a first query 314 may be associated with a username and a company where the user works such as, for example, string "Daniel Bernhardt Facebook," where the n-gram "Facebook" is associated with a particular company name of an object stored in a companies vertical. In other words, a first vertical of the first query 314 may be associated with usernames and a second vertical of the first query 314 may be associated with companies where users work. Alternatively, a single vertical of the first query 314 may be associated with combinations of a username and an entity such as a company where the user works (for example, continuing with the prior example, a single vertical may store both users and companies). As yet another example and not by way of limitation, a first query 314 may be associated with a username and a school where the user graduated from such as, for example, string "Daniel Bernhardt Cambridge," where the n-gram "Cambridge" is associated with a particular school name of an object stored in a schools vertical. In other words, a first vertical of the first query 314 may be associated with usernames and a second vertical of the first query 314 may be associated with schools where users graduated from. Alternatively, a single vertical of the first query 314 may be associated with combinations of a username and an entity such as a school where the user graduated from (for example, continuing with the prior example, a single vertical may store both users and schools). In particular embodiments, the entities corresponding to cities, companies, or schools (or any other suitable object associated with the online social network) may be represented as identification (ID) numbers. As an example and not by way of limitation, the first query 314 of "Daniel Bernhardt London" may be represented as "Daniel Bernhardt ID:12345," where "ID:12345" represents a unique identifier for an object stored in a locations vertical corresponding to the city of London, England. Although this disclosure describes searching the online social networking using particular search queries associated with particular verticals in a particular manner, this disclosure contemplates searching the online social network using any suitable search queries associated with any suitable verticals in any suitable manner.

In particular embodiments, spell-checker system 300 may utilize bloom filters to detect and correct the misspelled n-grams in search queries. In particular embodiments, a bloom filter may utilize one or more hash functions to indicate whether an element is a member of a set. As an example and not by way of limitation, a bloom filter may utilize one or more hash functions to indicate whether "Daniel Bernhardt" is a member of a set of object names corresponding to usernames from the online social network.

In particular embodiments, bloom filters may allow social-networking system 160 to reduce resources (for example, computing and/or storage hardware resources) for determining correctly spelled variants of the misspelled n-grams for retrieval of search results corresponding to a misspelled search query. In particular embodiments, a bloom filter may determine whether the n-grams of a search query corresponding to a username (or other object name) exist in a first set of object names from social-networking system 160 in order to prevent spell-correcting a real but rare username. As an example and not by way of limitation, the bloom filter may determine whether the username could be associated with derived nicknames, alternative names, and/or alternate forms of the username associated with username n-grams from the first set of object names. In particular embodiments, a bloom filter may determine whether n-grams of a search query corresponding to an entity exist in a first set of object names from social-networking system 160 in order to prevent spell-correcting a real but rare entity. As an example and not by way of limitation, referencing an example first query 314 of "Daniel Bernhardt Square," a bloom filter may determine whether the n-gram "Square," corresponding to a company name, entity exists in a first set of object names from social-networking system 160 associated with companies in order to prevent spell-correcting a real but rare company name. In particular embodiments, a bloom filter may detect whether one or more n-grams of a search query correspond to a real but rare username or entity. As an example and not by way of limitation, continuing with the earlier example of "Daniel Bernhardt Square," a bloom filter may determine whether the n-grams "Daniel Bernhardt" exists in a first set of object names from social-networking system 160 associated with usernames in order to detect whether "Daniel Bernhardt" corresponds to a real but rare username. In particular embodiments, the first set of object names may be provided by social-networking system 160 and/or third-party system 170. Although this disclosure describes utilizing particular bloom filters to detect particular misspellings in a particular manner, this disclosure contemplates utilizing any suitable bloom filters to detect any suitable misspellings in any suitable manner.

In particular embodiments, a bloom filter may include a plurality of sub bloom filters corresponding to each vertical associated with first query 314. As such, the first set of object names may include a plurality of subsets of the first set of object names, where each subset of object names is associated with a sub bloom filter. Furthermore, the first set of object names may be associated with the verticals associated with first query 314. As an example and not by way of limitation, referencing a first query 314 that includes a username and a city where the user lives (for example, string "Daniel Bernhardt London" as discussed above), a first sub bloom filter may be associated with the usernames and a second sub bloom filter may be associated with cities where users live. Each sub bloom filter may then be utilized to detect and correct misspelled n-grams from the first query 314 (for example, the usernames bloom filter may determine whether the n-gram "Daniel Bernhardt" is misspelled, while the city names bloom filter may determine whether the n-gram "London" is misspelled). Accordingly, a first subset of object names associated the first sub bloom filter may include usernames and a second subset of object names associated with the second sub bloom filter may include cities where users live. Alternative, a single bloom filter may be associated with all valid combinations of a username and a city where the user lives. Accordingly, a single set of object names associated with the single bloom filter may include all valid combinations of a user and a city where the user lives. As another example and not by way of limitation, referencing a vertical associated with first query 314 corresponding to usernames, a first set of object names may include username tokens from a database. Furthermore, a first subset of the first set of object names may include tokens corresponding to first names, a second subset of the first set of object names may include tokens corresponding to nick names, and a third subset of the first set of object names may include tokens corresponding to last names. As another example and not by way of limitation, referencing the first set of object names including the username tokens as discussed earlier, a first subset of the first set of object names may include username tokens in the order last name→first name (e.g., "Bernhardt, Daniel") and a second subset of the first set of object names may include username tokens in the order first name→last name (e.g., "Daniel Bernhardt"). As yet another example and not by way of limitation, a first set of object names associated with a bloom filter may substantially include previous search queries and/or corrected misspelled search queries that have low confidence scores (for example, caused by low conversion rates and/or low measures of interactions) or high confidence scores (for example, caused by high conversion rates and/or high measures of interactions). In particular embodiments, a set of object names associated with a bloom filter having a plurality of sub bloom filters may have more coverage than another set of object names associated with a single bloom filter. The increased in coverage of a set of object names may increase a probability of false positives associated with a bloom filter of the set of object names, or improve a granularity of the bloom filter. As such, the bloom filter may provide a quantized probability or likelihood that an n-gram is a member of the set of object names, and not just a binary indicator (for example, true or false) indicating whether the n-gram is a member of the set of object names. As an example and not by way of limitation, three sub bloom filters of the bloom filter may provide three quantized levels of probabilities. In particular embodiments, it may be more desirable to utilize such bloom filter having a plurality of sub bloom filters than conventional language models to detect and/or correct misspelled n-grams. Although this disclosure describes particular sub bloom filters and particular subsets of object names, the disclosure contemplates any suitable sub bloom filters and any suitable subsets of object names.

In particular embodiments, spell-checker system 300 may include misspelled classifier component 304. Misspelled classifier component 304 may indicate whether first query 314 is misspelled. In particular embodiments, misspelled classifier component 304 may receive the n-grams from segmentation component 302 and detect whether one or more of the n-grams of first query 314 are misspelled (which may be done in conjunction with a bloom filter). As an example and not by way of limitation, referencing first query 314 corresponding to a username, misspelled classifier component 304 may detect whether a last name component, a first name component, and/or a middle name component of the username is misspelled. As another example and not by way of limitation, continuing with the earlier example first query 314 of "Daniel Bernhardt Facebook," misspelled classifier component 304 may detect whether the n-gram "Daniel" corresponding to a first name component and the n-gram "Bernhardt" corresponding to a last name component are misspelled. As yet another example and not by way of limitation, referencing FIG. 4, misspelled classifier component 304 may receive data 402 from segmentation component 302 and detect whether one or more of the n-grams of first query 314 (i,e. $n\text{-}gram_1$, $n\text{-}gram_2$, and $n\text{-}gram_3$) are misspelled. In particular embodiments, misspelled classifier component 304 may utilize a language model to detect whether each n-gram of first query 314 is invalid (i.e. misspelled). As an example and not by way of limitation, referencing first query 314 corresponding to a username, misspelled classifier component 304 may utilize a first name language model to detect whether an n-gram corresponding to a first name is invalid. Furthermore, misspelled classifier component 304 may utilize a second name language model to detect whether an n-gram corresponding to a last name is invalid. As another example and not by way of limitation, continuing with the earlier example first query 314 of "Daniel Bernhardt Facebook," misspelled classifier component 304 may utilize a first name language model to detect whether the n-gram "Daniel" is invalid. Furthermore, misspelled classifier component 304 may utilize a second language model to detect whether the n-gram "Bernhardt" is invalid. In particular embodiments, misspelled classifier component 304 may also utilize a grammar language model to determine whether any of the n-grams of the username is invalid. A grammar language model may indicate whether any of the n-grams follow a set of pre-determined structural rules that govern the composition of clauses, phrases, and words in a natural language. For example, referencing an example first query 314 of "Daniel @ Bernhardt" corresponding to a username, misspelled classifier component 304 may utilize a grammar language model to determine that the n-gram "@" is invalid. In particular embodiments, misspelled classifier component 304 may detect whether each n-gram of first query 314 is misspelled by detecting whether the n-gram could be located in a pre-determined database. As such, if the n-gram could not be located in the pre-determined database, the n-gram may be misspelled. The pre-determined database may be provided by social-networking system 160. As an example and not by way of limitation, social-networking system 160 may provide a username database for misspelled classifier component 304 to detect whether any n-grams of first query 314 corresponding to a username are misspelled. In particular embodiments, misspelled classifier component 304 may utilize a decision tree that detects whether the n-gram could be located in the pre-determined database. As an example and not by way of limitation, referencing first query 314 corresponding to a username, a pre-determined username database may be built on the premise that a fraction of users of the online social network have unique usernames (for example, approximately 50% of users of the online social network may have unique combinations of last and first names). In particular embodiments, the username database may include one or more views (for example, database queries) represented by one or more language models. As an example and not by way of limitation, a language model may provide a plurality of first names that appear more than a threshold number of times in a data store 164. Accordingly, if the first or last name n-gram of a username could not be located in the pre-determined username database, a decision tree of misspelled classifier component 304 may indicate that the username is misspelled. Although this disclosure describes utilizing particular language models to detect whether particular search queries are misspelled, this disclosure contemplates utilizing any suitable language models to detect whether any suitable search queries are misspelled. Furthermore, although this disclosure describes utilizing particular decision trees to detect whether particular search queries are misspelled, this disclosure contemplates utilizing any suitable classification methods to detect whether any suitable search queries are misspelled.

As discussed above, misspelled classifier component 304 may utilize a bloom filter detect whether any of the n-grams of first query 314 are misspelled. Misspelled classifier component 304 may utilize the bloom filter to determine whether the n-gram exists or does not exist in a first set of object names. As an example and not by way of limitation, the bloom filter may indicate, on a binary (for example, yes/no or true/false) basis, whether the n-gram exists or does not exist in the first set of object names. In particular embodiments, if the n-gram has been indicated to exist in the first set of object names, the bloom filter may further determine a probability or likelihood that the n-gram exists in the first set of object names. In particular embodiments, a bloom filter having a pre-determined level of granularity may determine a probability or likelihood (for example, quantized probability) that the n-gram exists in the first set of object names, as discussed above. Herein, reference to a bloom filter determining whether an n-gram exists or does not exist in a first set of object names may encompass the bloom filter determining whether the n-gram belongs or does not belong to the first set of object names, or vice-versa, where appropriate. Furthermore, if the determined likelihood or probability is below a threshold score, the n-gram may be indicated by the bloom filter as misspelled. As an example and not by way of limitation, referencing the example first query of "Daniel Bernhardt," misspelled classifier component 304 may utilize a bloom filter to indicate whether the n-grams "Daniel Bernhardt" exists to a first set of object names. If the bloom filter indicates that the n-grams "Daniel Bernhardt" does not exist the first set of object names, the determined likelihood or probability may be 0%. In particular embodiments, the determination of the likelihood or probability may be further based on a language model and/or an error-correction model. An error-correction model may contribute to the likelihood or probability based at least on a number of characters that the n-gram differs from an object name of the first set of object names that is substantially similar to the n-gram. In particular embodiments, referencing a bloom filter including one or more sub bloom filters, misspelled classifier component 304 may utilize one of the sub bloom filters to indicate whether the n-gram does not exist in a subset of object names associated with the sub bloom filter. As an example and not by way of limitation, a mandarin-based username may be a three character n-gram. Accordingly, misspelled classifier component 304 may utilize three sub bloom filters of the bloom filter (for example, each sub bloom filter may correspond to one of the characters of the username) to indicate whether each character n-gram does not exist in a subset of object names associated with the sub bloom filter. In particular embodiments, the n-grams of first query 314 may correspond to a plurality of verticals. As such, misspelled classifier component 304 may utilize a bloom filter comprising a plurality of sub bloom filters where each sub bloom filter corresponds to a vertical of the first query 314. Furthermore, misspelled classifier component 304 may utilize the sub bloom filters to detect whether each n-gram of the first query 314 is misspelled by indicating whether the n-gram does not exist in a subset of object names associated with the sub bloom filter and a vertical of the sub bloom filter. As an example and not by way of limitation, referencing first query 314 of "Daniel Bernhardt London." misspelled classifier component 304 may utilize a bloom filter comprising a first sub bloom filter for "Daniel Bernhardt" and a second sub bloom filter for "London." Misspelled classifier component 304 may utilize the first sub bloom filter to detect whether bi-gram "Daniel Bernhardt" is misspelled by indicating whether the bi-gram does not exist in a first subset of object names associated with the first sub bloom filter and a users vertical of social graph 200. Furthermore, misspelled classifier component 304 may utilize the second sub bloom filter to detect whether n-gram "London" is misspelled by indicating whether the n-gram does not exist in a second subset of object names associated with the second sub bloom filter and a locations vertical of social graph 200. In particular embodiments, misspelled classifier component 304 may send one or more of the misspelled n-grams to variant-tokens generation component 306, which is discussed in more detail below. As an example and not by way of limitation, referencing FIG. 4, misspelled classifier component 304 may indicate that n-gram$_2$ and n-gram$_3$ of data 402 are misspelled. Accordingly, misspelled classifier component 304 may send the misspelled n-gram$_2$ and n-gram$_3$ to variant-tokens generation component 306. In particular embodiments, together with the bloom filter, misspelled classifier component 304 may detect whether each n-gram of the first query 314 is misspelled by utilizing one or more of a suitable language model, a suitable decision tree, or a suitable pre-determined database in any suitable manner. As an example and not by way of limitation, misspelled classifier component 304 may send an n-gram indicated to be misspelled by a language model to the bloom filter for further determination. As another example and not by way of limitation, misspelled classifier component 304 may send an n-gram indicated to be misspelled by a decision tree to the bloom filter for further determination. Although this disclosure describes utilizing particular bloom filters to detect whether n-grams are misspelled in a particular manner, this disclosure contemplates utilizing any suitable bloom filter to detect whether any suitable n-gram is misspelled in any suitable manner.

In particular embodiments, spell-checker system 300 may include variant-tokens generation component 306. Variant-tokens generation component 306 may receive the misspelled n-grams from misspelled classifier component 304 and identify one or more variant-tokens for each misspelled n-gram. As an example and not by way of limitation, referencing FIG. 4, variant-tokens generation component 306 may receive the misspelled n-gram$_2$ and n-gram$_3$ from misspelled classifier component 304. Furthermore, variant-tokens generation component 306 may generate variant-_token$_2$[1–M] for misspelled n-gram$_2$ and variant_token$_3$[1–M] for misspelled n-gram$_3$. In particular embodiments, variant-tokens generation component 306 may generate the variant-tokens for each misspelled n-gram based at least on a bloom filter of misspelled classifier component 304 and a first set of object names associated with the bloom filter. As an example and not by way of limitation, variant-tokens generation component 306 may generate the variant-tokens for each misspelled n-gram based at least on the bloom filter indicating whether each generated variant-token belongs to the first set of object names. In particular embodiments, variant-tokens generation component 306 may utilize a pre-determined set of rules to identify the variant-tokens for the misspelled n-grams. Furthermore, the set of rules may depend on a vertical associated with first query 314. As such, the set of rules may determine how each variant-token should be identified for each misspelled n-gram according to the vertical associated with the first query 314. As an example and not by way of limitation, referencing a vertical corresponding to usernames, a set of rules may determine that the variant-tokens for a first n-gram of a misspelled username n-gram should be identified as a first name component. As another example and not by way of limitation, the set of rules may determine that the variant-tokens for a second n-gram of the misspelled username n-gram should be identified as a last name component, In particular embodiments, variant-tokens generation component 306 may be operated to identify one or more variant-tokens for each correctly spelled n-gram of first query 314. In particular embodiments, variant-tokens generation component 306 may generate the variant-tokens for each correctly spelled n-gram based at least on a bloom filter of misspelled classifier component 304 and a first set of object names associated with the bloom filter. As an example and not by way of limitation, referencing first query 314 corresponding to a username, variant-tokens generation component 306 may determine a sub bloom filter (for example, a first name sub bloom filter or a last name sub bloom filter) of misspelled classifier component 304 to look up one or more variant-tokens for a misspelled n-gram of the username. In particular embodiments, variant-tokens generation component 306 may generate the variant-tokens for each correctly spelled n-gram based on a new bloom filter that is different from the bloom filter of misspelled classifier component 304. Furthermore, a second set of object names associated with the new bloom filter may be different from the first set of object names of misspelled classifier component 304. As an example and not by way of limitation, the second set of object names may include the elements of the first set of object names and one or more new elements. In particular embodiments, misspelled classifier component 304 may utilize a language model to generate each variant-token for the n-gram. The language model may determine a probability or likelihood that the variant-token substantially corrects the misspelled n-gram based at least on a formal grammatical construct. The language model may depend on the querying user. Furthermore, the language model may be associated with a demographic feature of the querying user. As an example and not by way of limitation, the formal grammatical construct of the language model may depend on a language preference associated with the querying user. In particular embodiments, the language model may be a position dependent language model. As an example and not by way of limitation, referencing first query 314 corresponding to a username, variant-tokens generation component 306 may utilize a first-name language model for a first n-gram of first query 314 corresponding to a first name of the username and a second-name language model for a second n-gram of first query 314 corresponding to a last name of the username. In particular embodiments, variant-tokens generation component 306 may send one or more of the variant-tokens corresponding to each n-gram of first query 314 to phrase selection component 308. As an example and not by way of limitation, referencing FIG. 4, variant-tokens generation component 306 may send data 404 including token$_1$ (i.e. correctly-spelled n-gram$_1$), variant_token$_2$[1–M], and variant_token$_3$[1–M] to phrase selection component 308. Although this disclosure describes generating particular variant-tokens for particular n-grams in a particular manner, the disclosure contemplates generating any suitable variant-tokens for any suitable n-grams in any suitable manner.

In particular embodiments, spell-checker system 300 may include phrase selection component 308. Phrase selection component 308 may receive variant-tokens for misspelled n-grams from variant-tokens generation component 306. Furthermore, phrase selection component 308 may generate one or more unique combinations of the n-grams and variant-tokens. As an example and not by way of limitation, referencing FIG. 4, phrase selection component 308 may receive data 404 from variant-tokens generation component 306, where data 404 includes token$_1$, variant_token$_2$[1–M], and variant_token$_3$[1–M]. Furthermore, based at least on data 404, phrase selection component 308 may generate unique combinations 406 corresponding to [token$_1$, variant_token$_2$[1], variant_token$_3$[2]], [token$_1$, variant_token$_2$[3], variant_token$_3$[3]], and [token$_1$, variant_token$_2$[M], variant_token$_3$[3]]. In particular embodiments, if variant-tokens generation component 306 is operated to generate variant-tokens for each correctly spelled n-gram, phrase selection component 308 may generate unique combinations of one or more of the variant-tokens corresponding to the n-grams of first query 314. In particular embodiments, phrase selection component 308 may calculate a token score for each variant-token based at least on a language model and an error-correction model. The language model may contribute to the token score based on whether the variant-token is a functionally correct string in a natural language. The error-correction model may contribute to the token score based at least on a number of characters that the variant-token differs from the corresponding n-gram. The language model and the error-correction model may be associated with a vertical associated with first query 314. The variant-tokens that make the most sense may be scored the highest. In particular embodiments, each variant-token may be assigned a token score based at least on a probability as determined by the language model and the error-correction model. As an example and not by way of limitation, the probability may indicate whether the variant-token is a likely correction of the misspelled n-gram given first query 314. In particular embodiments, each variant-token may be scored according to a token score function. The token score function may calculate a token score for each variant-token based at least on the probability determined by the language model and the error-correction model, as described above. In particular embodiments, phrase selection component 308 may generate unique combinations where each unique combination includes variant-tokens having token scores greater than a threshold token score. In particular embodiments, phrase selection component 308 may generate unique combinations where each unique combination includes top N-ranked variant-tokens based on their sorted token scores. Although this disclosure describes scoring particular variant-tokens of particular n-grams in a particular manner, the disclosure contemplates scoring any suitable variant-tokens of any suitable n-grams in any suitable manner.

In particular embodiments, phrase selection component 308 may calculate a combination score for each unique combination. As an example and not by way of limitation, referencing FIG. 4, phrase selection component 308 may calculate a combination score for each unique combination of [token$_1$, variant_token$_2$[1], variant_token$_3$[2]], [token$_1$, variant_token$_2$[3], variant_token$_3$[3]], and [token$_1$, variant_token$_2$[M], variant_token$_3$[3]]. In particular embodiments, phrase selection component 308 may calculate the combination score based at least on a bloom filter of misspelled classifier component 304 and the first set of object names associated with the bloom filter. Phrase selection component 308 may calculate the combination score based on whether the bloom filter indicate the unique combination does not exist in the first set of object names associated with the bloom filter and a vertical of the bloom filter. In particular embodiments, phrase selection component 308 may calculate a combination score for each unique combination based on whether one or more sub bloom filters of the bloom filter indicate the unique combination does not exist in one or more subsets of the object names associated with the sub bloom filters and the verticals of the sub bloom filters. Furthermore, the bloom filter may utilize an error-correction model to determine a probability or likelihood that the unique combination corrects the misspelled n-grams based on one or more sub bloom filters corresponding to the misspelled n-grams. As an example and not by way of limitation, the error-correction model may consider the unique combination having the highest combination score calculated by phrase selection component 308 based on the sub bloom filters. Thereafter, the error-correction model may determine the probability or likelihood based on a deviation of the unique combination from the misspelled first query 314. This may be useful for spell-correcting Mandarin-based n-grams. In particular embodiments, the combination scores for one or more of the unique combinations may be determined by other criteria. As an example and not by way of limitation, the criteria may include an indication of a valid grammar construct for the unique combination, an indication of whether the unique combination may be associated with a pre-determined database of previously identified lexicons associated with a vertical associated with first query 314, one or more click signals associated with social-networking system 160, and/or data from social-networking system 160. As an example and not by way of limitation, a click signal may be associated with a measure of interactions with the unique combination by one or more users of social-networking system 160, compared to a measure of interactions with the misspelled first query 314 by the users of social-networking system 160. As another example and not by way of limitation, data from social-networking system 160 may include one or more objects from social graph 200 of social-networking system 160 that substantially match the unique combination. As such, a combination score of the unique combination may be proportional to a quantity of the objects that are associated with the querying user. In particular embodiments, phrase selection component 308 may utilize one or more combination score functions to calculate a combination score for each unique combination. Furthermore, a combination score function for each unique combination may be discrete or continuous. As an example and not by way of limitation, a discrete combination score function may be based on a measure of interactions with the unique combination by one or more users of social-networking system 160. As another example and not by way of limitation, a continuous token score function may be based on a probability or likelihood that the unique combination corresponds to a correctly spelled first query 314, where the probability or likelihood may be determined by the error-correction model based at least on one or more sub bloom filters. In particular embodiments, phrase selection component 308 may send one or more unique combinations having combination scores greater than a threshold combination score to phrase classification component 310. As an example and not by way of limitation, referencing FIG. 4, phrase selection component 308 may send unique combinations [$token_1$, $variant\_token_2[1]$, $variant\_token_3[2]$] and [$token_1$, $variant\_token_2[3]$, $variant\_token_3[3]$] having combination scores greater than the threshold combination score to phrase classification component 310. In particular embodiments, a combination score for a unique combination may not correlate with a token score of each variant-token of the unique combination. As an example and not by way of limitation, referencing FIG. 4, unique combination [$token_1$, $variant\_token_2[1]$, $variant\_token_3[2]$] may receive a higher combination score than unique combination [$token_1$, $variant\_token_2[3]$, $variant\_token_3[3]$]. However $variant\_token_2$ [3] of the lower scored unique combination may receive a higher token score than $variant\_token_2[1]$ of the higher scored unique combination. Although this disclosure describes generating particular unique combinations of particular variant-tokens and/or particular n-grams in a particular manner, the disclosure contemplates generating any suitable unique combinations of any suitable variant-tokens and/or any suitable n-grams in any suitable manner. Furthermore, although this disclosure describes scoring particular unique combinations in a particular manner, the disclosure contemplates scoring any suitable unique combinations in any suitable manner.

In particular embodiments, spell-checker system 300 may include phrase classification component 310. Phrase classification component 310 may receive one or more unique combinations of variant-tokens and/or n-grams from phrase selection component 308. In particular embodiments, phrase classification component 310 may receive as input one or more of the unique combinations having combination scores higher than a threshold combination score. Phrase classification component 310 may classify each unique combination to indicate whether the unique combination is suitable as a search query. As an example and not by way of limitation, referencing FIG. 4, phrase classification component 310 may receive unique combinations [$token_1$, $variant\_token_2[1]$, $variant\_token_3[2]$] and [$token_1$, $variant\_token_2[3]$, $variant\_token_3[3]$] having combination scores higher than the threshold combination score from phrase selection component 308. Furthermore, phrase classification component 310 may classify each received unique combination to indicate whether the received unique combination is suitable as a search query. In particular embodiments, phrase classification component 310 may classify each received unique combination to filter out received unique combinations that are bad phrases. In particular embodiments, phrase classification component 310 may classify each unique combination to indicate whether the unique combination is suitable as a search query associated with a vertical associated with first query 314. As an example and not by way of limitation, referencing a vertical corresponding to usernames, phrase classification component 310 may utilize a bloom filter (for example, bloom filter of misspelled classifier component 304) to determine, on a binary basis (for example, yes or no), whether each unique combination does not belong to a set of object names corresponding to previously-known and invalid content (for example, usernames) of social-networking system 160. Accordingly, the bloom filter may indicate whether the unique combination could be shown to the querying user, included in the search results associated with first query 314, and/or suitable to be utilized as a search query. In particular embodiments, phrase classification component 310 may send unique combinations that are indicated to be suitable as search queries to phrase confidence scoring component 312. Although this disclosure describes classifying particular unique combinations in a particular manner, the disclosure contemplates classifying any suitable unique combinations in any suitable manner.

In particular embodiments, spell-checker system 300 may include phrase confidence scoring component 312. Phrase confidence scoring component 312 may receive as input one or more unique combinations from phrase selection component 308, where the unique combinations have combination scores higher than a threshold combination score. As an example and not by way of limitation, referencing FIG. 4, phrase confidence scoring component 312 may receive unique combinations [$token_1$, $variant\_token_2[1]$, $variant\_token_3[2]$] and [$token_1$, $variant\_token_2[3]$, $variant\_token_3$

[3]] having combination scores greater than the threshold combination score from phrase selection component 308. Phrase confidence scoring component 312 may also receive as input one or more of the unique combinations having being classified by phrase classification component 310 to be suitable as search queries. Furthermore, phrase confidence scoring component 312 may calculate a confidence score for each unique combination. As an example and not by way of limitation, referencing FIG. 4, phrase confidence scoring component 312 may calculate confidence scores for [$token_1$, $variant\_token_2[1]$, $variant\_token_3[2]$] and [$token_1$, $variant\_token_2[3]$, $variant\_token_3[3]$]. In particular embodiments, phrase confidence scoring component 312 may calculate a confidence score for each unique combination based at least in part on first query 314 or whether the unique combination exists in a first set of object names. In particular embodiments, a confidence score for each unique combination may be based on an indication by a bloom filter of misspelled classifier component 304 that the unique combination does not exist in the first set of object names. As an example and not by way of limitation, the confidence score may be based on a probability or likelihood that the unique combination does not belong to the first set of object names. In particular embodiments, a confidence score for each unique combination may be based on an error model. The error model may model a probability or likelihood that the unique combination would have been produced by the user when the user attempts to correct the misspelled first query 314 where the misspelling may be due to a typographical and/or phonetic error. As an example and not by way of limitation, referencing first queries 314 of "john" and "jhon", the error model may determine that both "john" and "jhon" have substantially similar probabilities even though a language model (or a suitable bloom filter) may determine that "john" could be a more likely first query 314. As another example and not by way of limitation, referencing first queries 314 of "xobx" and "xbox", the error model may determine that both "xobx" and "xbox" have substantially similar probabilities even though a language model (or a suitable bloom filter) may determine that "xbox" could be a more likely first query 314. In particular embodiments, the probability or likelihood may be determined at least by one or more pre-determined constraints associated with first query 314. If the unique combination deviates from any of the pre-determined constraints, the unique combination may be assigned a lower confidence score. As an example and not by way of limitation, a pre-determined constraint for first query 314 having addresses as a vertical may indicate that the n-grams for each unique combination to be in a particular order (for example, town→city→state→country). As such, any unique combinations whose variant-tokens (or variant-tokens and n-grams) deviated from the order could receive a lower confidence score. In particular embodiments, a confidence score for each unique combination may be based on a language model. The language model may be associated with first query 314. The language model may indicate whether the unique combination is functionally correct according to the natural language associated with the first query 314. As an example and not by way of limitation, the language model may include a statistical language model, a positional language model, a factored language model, or any suitable combinations thereof. In particular embodiments, a confidence score for each unique combination may be based on one or more lexicons associated with a vertical associated with first query 314. As an example and not by way of limitation, a confidence score for each unique combination may be based on whether one or more n-grams of the unique combination could be located within a lexicon of the vertical. In particular embodiments, a confidence score for each unique combination may be based on whether the unique combination is relevant to a delivery of advertisements to the querying user. As an example and not by way of limitation, the confidence score may depend on one or more conversion scores of one or more objects of social graph 200 that substantially match the unique combination. In particular embodiments, a confidence score for each unique combination may be based on one or more social affinities of one or more of objects of social graph 200 to the querying user, where the objects substantially match the unique combination. As an example and not by way of limitation, a confidence score for each unique combination may be proportional to a measure of social affinity of an object of the unique combination. In particular embodiments, a confidence score for each unique combination may be based on a number of times the unique combinations appears as a search query in the past. As an example and not by way of limitation, a unique combination having a higher number of previous appearances may have a higher confidence score than another unique combination having a lower number of previous appearances. In particular embodiments, the confidence score for each unique combination may be continuous. In particular embodiments, if a confidence score for each unique combination is below a confidence score threshold, spell-checker system 300 may re-generate variant-tokens for each misspelled n-gram using alternate means. As an example and not by way of limitation, variant-tokens generation component 306 may switch from utilizing a bloom filter to utilizing one or more positional language models to re-generate variant-tokens for each misspelled n-gram. In particular embodiments, phrase confidence scoring component 312 may send one or more unique combinations having confidence scores higher than a confidence score threshold to social-networking system 160. Accordingly, these unique combinations may form one or more second queries 316. In particular embodiments, phrase confidence scoring component 312 may send a unique combination having the highest confidence score to social-networking system 160, where the unique combination forms second query 316. As an example and not by way of limitation, referencing FIG. 4, phrase confidence scoring component 312 may send unique combination 408 corresponding to [$token_1$, $variant\_token_2[3]$, $variant\_token_3[3]$] having the highest confidence score to social-networking system 160, where unique combination 408 forms second query 316. Although this disclosure describes scoring particular unique combinations in a particular manner, the disclosure contemplates scoring any suitable unique combinations in any suitable manner.

In particular embodiments, social-networking system 160 may receive second query 316 from spell-checker system 300, where second query 316 corresponds to a unique combination from phrase confidence scoring component 312. As an example and not by way of limitation, referencing FIG. 4, social-networking system 160 may receive second query 316 from spell-checker system 300, where second query 316 corresponds to unique combination 408 from phrase confidence scoring component 312. In particular embodiments, social-networking system 160 may identify one or more objects of social graph 200 that match second query 316. As an example and not by way of limitation, referencing FIG. 4, social-networking system 160 may identify one or more objects of social graph 200 that match unique combination 408. In particular embodiments, social-networking system 160 may generate a search-results page responsive to first query 314. The search-results page may include one or more references to one or more of the identified objects of social graph 200. In particular embodiments, the search-results page may include an indication that second query 316 has been spell-corrected. As an example and not by way of limitation, the search-results page may include a notification that includes one or more unique combinations generated by spell-checker system 300 for the misspelled first query 314, where the unique combinations correspond to likely correctly-spelled versions of the misspelled first query 314, as discussed above. In particular embodiments, social-networking system 160 may send the search-results page to the client device of the querying user associated with first query 314. Although this disclosure describes and illustrates particular steps for detecting and correcting particular misspelled search query as occurring in a particular order, this disclosure contemplates any suitable steps for detecting and correcting any suitable misspelled search query occurring in any suitable order. Moreover, although this disclosure describes and illustrates particular components, devices, or systems of spell-checker system 300 for detecting and correcting particular misspelled search query, this disclosure contemplates any suitable combination of any suitable components, devices, or systems of spell-checker system 300 for detecting and correcting any suitable misspelled search query in any suitable manner. As an example and not by way of limitation, a token score for each variant-token may be calculated by variant-tokens generation component 306, instead of phrase selection component 308. As such, variant-tokens generation component 306 may send to phrase selection component 308 variant-tokens having token scores greater than a threshold token score. In particular embodiments, the token score for each variant-token may be calculated by a variant-token scoring component (not shown in FIG. 3). The variant-token scoring component may be trained to determine the token scores based at least on a probability as determined by a language model and an error-correction model, as discussed above. Furthermore, although the disclosure describes particular components of spell-checker system 300 utilizing particular error models, particular language model, or particular bloom filter in particular manners, the disclosure contemplates any suitable component of spell-checker system 300 utilizing one or more of any suitable error model, any suitable language model, or any suitable bloom filter in any suitable manners. As an example and not by way of limitation, each component of spell-checker system 300 may utilize at least an error model, a language model, and a bloom filter. As another example and not by way of limitation, variant-tokens generation component 306 may utilize one or more token-level (for example, uni-gram level) language models or one or more token-level (for example, uni-gram level) bloom filters. Furthermore, phrase selection component 308 and/or phrase classification component 310 may utilize one or more n-gram level language models or one or more n-gram level bloom filters.

Figure 4:
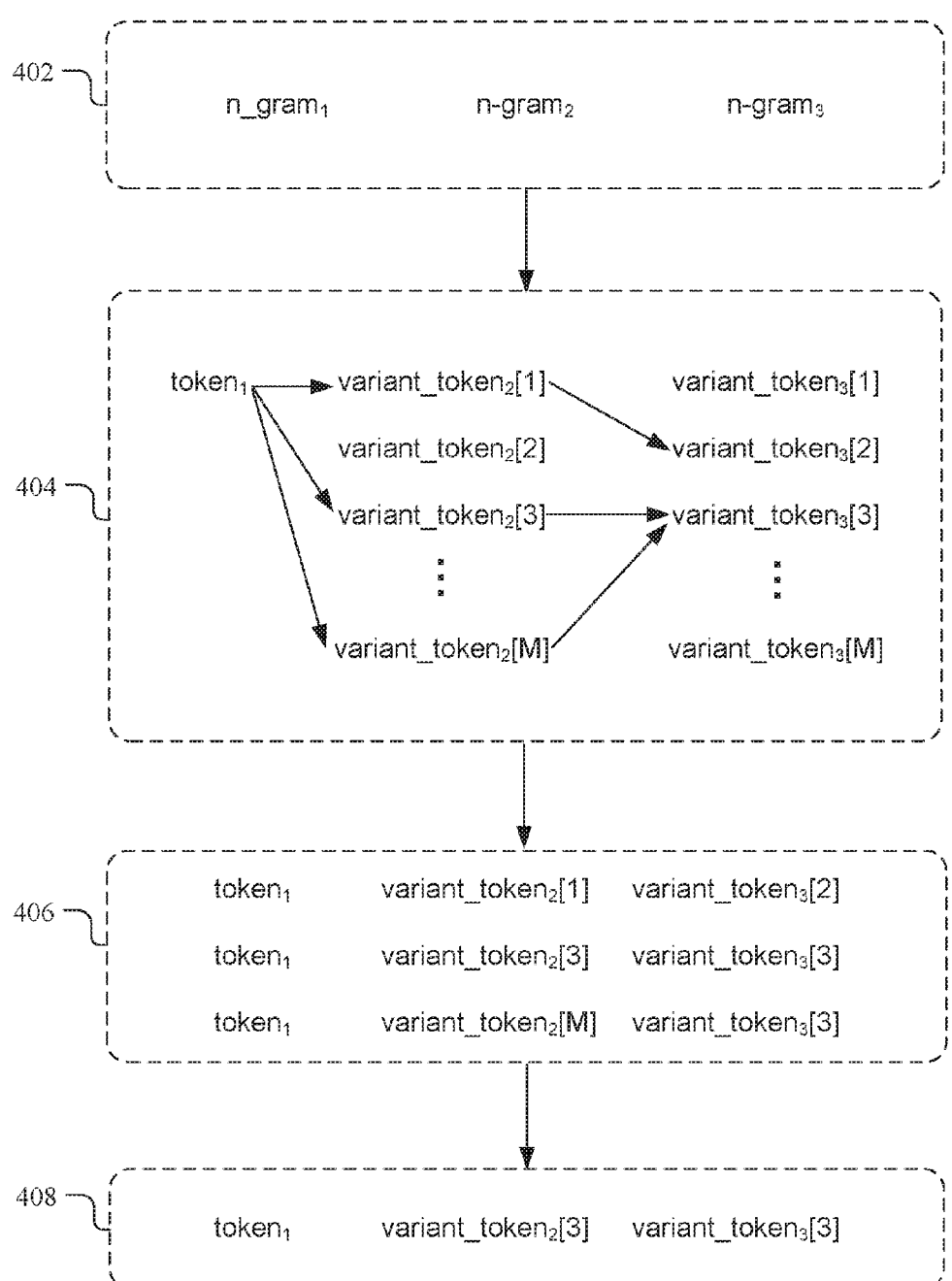
FIG. 4 illustrates an example data transformation flow associated with example spell-checker system of FIG. 3.

FIG. 4 illustrates data transformation flow 400 associated with spell-checker system 300. In particular embodiments, segmentation component 302 of spell-checker system 300 may generate data 402 corresponding one or more n-grams based at least on first query 314. In the example of FIG. 4, data 402 may correspond to n-gram$_1$, n-gram$_2$, and n-gram$_3$. Furthermore, segmentation component 302 may send data 402 to misspelled classifier component 304 of spell-checker system 300. In particular embodiments, misspelled classifier component 304 may indicate whether one or more n-grams of data 402 are misspelled. In the example of FIG. 4, misspelled classifier component 304 may indicate that n-gram$_2$ and n-gram$_3$ are misspelled. Accordingly, misspelled classifier component 304 may send the misspelled n-gram$_2$ and n-gram$_3$ to variant-tokens generation component 306. In particular embodiments, variant-tokens generation component 306 may generate variant tokens for each misspelled n-grams. In the example of FIG. 4, variant-tokens generation component 306 may generate variant_token$_2$[1-M] for misspelled n-gram$_2$ and variant_token$_3$[1-M] for misspelled n-gram$_3$. Furthermore. variant-tokens generation component 306 may send data 404 including correctly spelled n-grams and variant-tokens to phrase selection component 308. In the example of FIG. 4, variant-tokens generation component 306 may send data 404 including token$_1$ (i.e. correctly-spelled n-gram$_1$), variant_token$_2$[1-M], and variant_token$_3$[1-M] to phrase selection component 308. In particular embodiments, phrase selection component 308 may generate unique combinations of the correctly spelled n-grams and variant-tokens based at least on data 404. In the example of FIG. 4, based at least on data 404 received from variant-tokens generation component 306, phrase selection component 308 may generate unique combinations 406 corresponding to [token$_1$, variant_token$_2$[1], variant_token$_3$[2]], [token$_1$, variant_token$_2$[3], variant_token$_3$[3]], and [token$_1$, variant_token$_2$[M], variant_token$_3$[3]]. In particular embodiments, phrase selection component 308 may calculate a combination score for each unique combination of [token$_1$, variant_token$_2$[1], variant_token$_3$[2]], [token$_1$, variant_token$_2$[3], variant_token$_3$[3]], and [token$_1$, variant_token$_2$[M], variant_token$_3$[3]]. In particular embodiments, phrase selection component 308 may send unique combinations [token$_1$, variant_token$_2$[1], variant_token$_3$[2]] and [token$_1$, variant_token$_2$[3], variant_token$_3$[3]] having combination scores greater than a threshold combination score to phrase classification component 310 or phrase confidence scoring component 312. In particular embodiments, phrase classification component 310 may classify each received unique combination (i.e. [token$_1$, variant_token$_2$[1], variant_token$_3$[2]] or [token$_1$, variant_token$_2$[3], variant_token$_3$[3]]) to indicate whether the received unique combination is suitable as a search query. In particular embodiments, phrase confidence scoring component 312 may receive unique combinations from phrase selection component 308 or phrase classification component 310. In the example of FIG. 4, phrase confidence scoring component 312 may receive unique combinations [token$_1$, variant_token$_2$[1], variant_token$_3$[2]] and [token$_1$, variant_token$_2$[3], variant_token$_3$[3]] having combination scores greater than the threshold combination score from phrase selection component 308. In particular embodiments, phrase confidence scoring component 312 may calculate confidence scores for [token$_1$, variant_token$_2$[1], variant_token$_3$[2]] and [token$_1$, variant_token$_2$[3], variant_token$_3$[3]]. In the example of FIG. 4, unique combination 408 corresponding to [token$_1$, variant_token$_2$[3], variant_token$_3$[3]] receives the highest confidence score from phrase confidence scoring component 312. In particular embodiments, phrase confidence scoring component 312 may send unique combination 408 to social-networking system 160, where unique combination 408 forms second query 316. Although this disclosure describes and illustrates particular steps of the data transformation flow of FIG. 4 as occurring in a particular order, this disclosure contemplates any suitable steps of the data transformation flow of FIG. 4 occurring in any suitable order. Moreover, although this disclosure describes and illustrates particular data transformation flow associated with particular spell-checker system including the particular steps of the data transformation flow of FIG. 4, this disclosure contemplates any suitable data transformation flow associated with any suitable spell-checker system including any suitable steps, which may include all, some, or none of the steps of the data transformation flow of FIG. 4, where appropriate. Moreover, although the disclosure describes and illustrates variant-tokens generation component 306 generating an equal number (i.e. M) of variant-tokens (i.e. variant_token[1–M]) for each misspelled n-gram (i.e. n-gram$_2$, n-gram$_3$), the disclosure contemplates variant-tokens generation component 306 generating any suitable number of variant-tokens for each misspelled n-gram in any suitable manner. Furthermore, although this disclosure describes and illustrates particular components, devices, or systems carrying out particular steps of the data transformation flow of FIG. 4, this disclosure contemplates any suitable combination of any suitable components, devices, or systems carrying out any suitable steps of the data transformation flow of FIG. 4.

Figure 5:
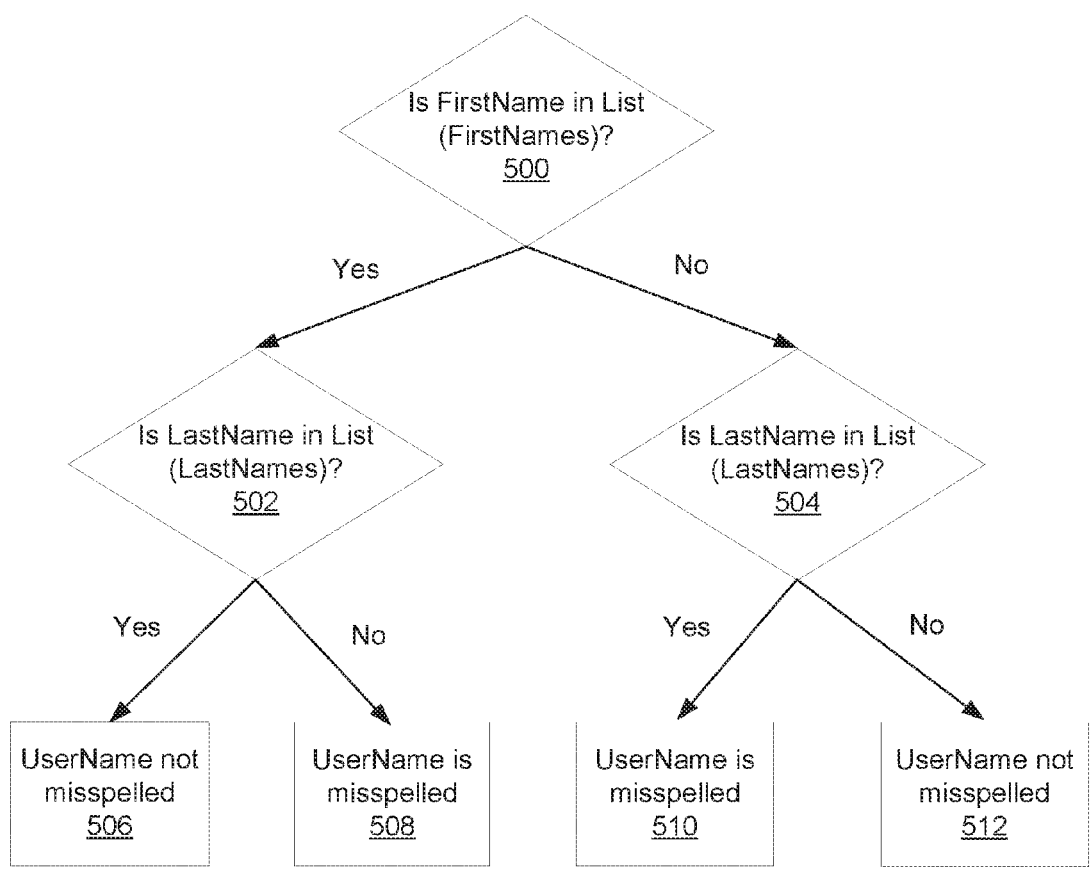
FIG. 5 illustrates an example decision tree for indicating whether an example username of a search query is misspelled.

FIG. 5 illustrates an example decision tree for indicating whether an example username of a search query is misspelled. As an example and not by way of limitation, the decision tree of FIG. 5 may indicate whether the username (i.e. UserName) of first query 314 is misspelled. As another example and not by way of limitation, the decision tree of FIG. 5 may indicate whether one or more n-grams of the username are misspelled. In particular embodiments, the decision nodes (for example, decision nodes 500, 502, and 504) of the decision tree may be operated by misspelled classification component 304 of spell-checker system 300. At decision node 500, misspelled classification component 304 may determine whether a first name n-gram (i.e. FirstName) of the username could be located in a list associated with first names (i.e. List(FirstNames)). In particular embodiments, the first name n-gram may correspond to a first n-gram of first query 314, where one or more n-grams corresponding to first query 314 are generated by segmentation component 302 of spell-checker system 300. In particular embodiments, misspelled classification component 304 may determine whether the first name n-gram could be located in a pre-determined finite-size database (i.e. List(FirstNames)) of unique combinations of first names and last names from social-networking system 160, as discussed above. In particular embodiments, if List(FirstNames) is incomplete, misspelled classification component 304 may utilize a bloom filter to indicate whether the first name n-gram does not belong to a set of object names that includes List(FirstNames). In particular embodiments, if List(FirstNames) is incomplete, misspelled classification component 304 may utilize a bloom filter to determine a probability or likelihood the first name n-gram belongs to a set of object names that includes List(FirstNames). As such, if the determined likelihood or probability is below a threshold score, misspelled classification component 304 may indicate that the first name n-gram could not be located in List(FirstNames). In particular embodiments, if the first name n-gram could not be located in List(FirstNames), misspelled classification component 304 may indicate that the first name n-gram is misspelled. At decision nodes 502 and 504, misspelled classification component 304 may determine whether a last name n-gram (i.e. LastName) of the username could be located in a list associated with last names (i.e. List(LastNames)). In particular embodiments, the last name n-gram may correspond to a second n-gram of first query 314, where one or more n-grams corresponding to first query 314 are generated by segmentation component 302 of spell-checker system 300. In particular embodiments, misspelled classification component 304 may determine whether the last name n-gram could be located in a pre-determined finite-size database (i.e. List(LastNames)) of unique combinations of first names and last names from social-networking system 160, as discussed above. In particular embodiments, if List(LastNames) is incomplete, misspelled classification component 304 may utilize a bloom filter to indicate whether the last name n-gram does not belong to a set of object names that includes List(LastNames). In particular embodiments, if List(LastNames) is incomplete, misspelled classification component 304 may utilize a bloom filter to determine a likelihood or probability that the last name n-gram belongs to a set of object names that includes List(LastNames). As such, if the determined likelihood or probability is below a threshold score, misspelled classification component 304 may indicate that the last name n-gram could not be located in List(LastNames). In particular embodiments, if the last name n-gram could not be located in List(LastNames), misspelled classification component 304 may indicate that the last name n-gram is misspelled.

At terminal node 506, if the first name n-gram could be located in List(FirstNames) and the last name n-gram could be located in List(LastNames), UserName is not misspelled. In particular embodiments, misspelled classification component 304 may indicate that the username of first query 314 is not misspelled. At terminal node 508, if the first name n-gram could be located in List(FirstNames) and the last name n-gram could not be located in List(LastNames), UserName is misspelled. In particular embodiments, misspelled classification component 304 may indicate that the username of first query 314 is misspelled. At terminal node 510, if the first name n-gram could not be located in List(FirstNames) and the last name n-gram could be located in List(LastNames), UserName is misspelled. In particular embodiments, misspelled classification component 304 may indicate that the username of first query 314 is misspelled. At terminal node 512, if the first name n-gram could not be located in List(FirstNames) and the last name n-gram could not be located in List(LastNames), UserName is not misspelled. In particular embodiments, misspelled classification component 304 may utilize a different means to determine whether the username is misspelled. As an example and not by way of limitation, misspelled classification component 304 may revise Username. As an example and not by way of limitation, UserName may be revised such that its FirstName corresponds to second n-gram of first query 314 and its LastName corresponds to first n-gram of first query 314. Thereafter, misspelled classification component 304 may utilize the decision tree to indicate whether the revised Username is misspelled. Although this disclosure describes and illustrates particular steps of the decision tree of FIG. 5 as occurring in a particular order, this disclosure contemplates any suitable steps of the decision tree of FIG. 5 occurring in any suitable order. Moreover, although this disclosure describes and illustrates an example decision tree for indicating whether particular username of particular search query is misspelled including the particular steps of the decision tree of FIG. 5, this disclosure contemplates any suitable decision tree for indicating whether any suitable username of any suitable search query is misspelled including any suitable steps, which may include all, some, or none of the steps of the decision tree of FIG. 5, where appropriate. Furthermore, although this disclosure describes and illustrates particular components, devices, or systems carrying out particular steps of the decision tree of FIG. 5, this disclosure contemplates any suitable combination of any suitable components, devices, or systems carrying out any suitable steps of the decision tree of FIG. 5.

Figure 6:
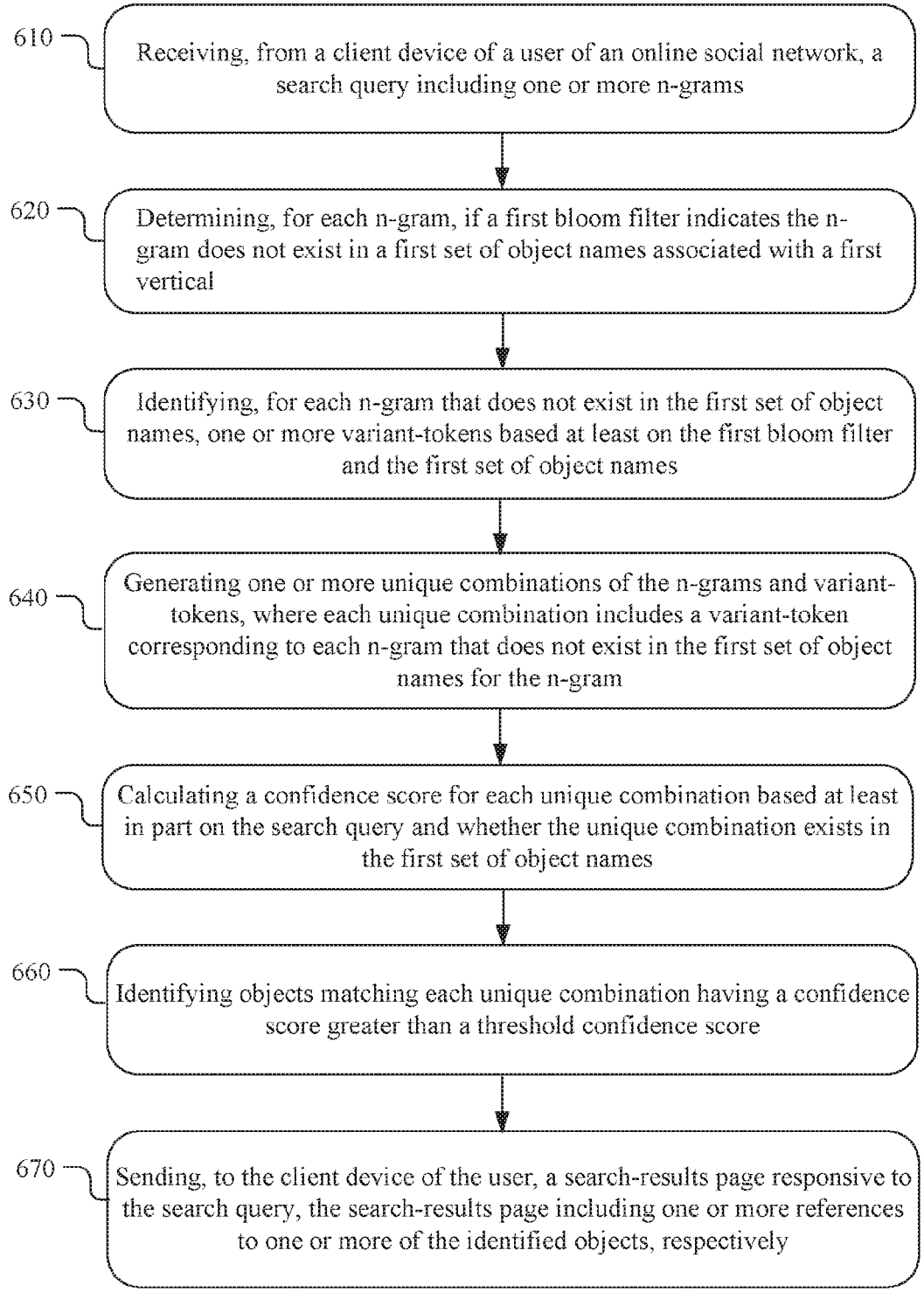
FIG. 6 illustrates an example method for detecting and correcting misspelled search queries.

FIG. 6 illustrates method 600 for detecting and correcting misspelled search queries. Method 600 may be operated by social-networking system 160. As an example and not by way of limitation, method 600 may be operated by spell-checker system 300 of social-networking system 160, as discussed above. At step 610, social-networking system 160 may receive, from a client device of a user of an online social network, a search query comprising one or more n-grams. As an example and not by way of limitation, referencing FIG. 3, segmentation component 302 of spell-checker system 300 may receive first query 314 from client system 130 of a querying user of social-networking system 160. The first query 314 may include one or more n-grams. At step 620, social-networking system 160 may determine, for each n-gram, if a first bloom filter indicates the n-gram does not exist in a first set of object names associated with a first vertical. As an example and not by way of limitation, referencing FIG. 3, misspelled classifier component 304 of spell-checker system 300 may determine, for each n-gram received from segmentation component 302, if a first bloom filter indicates the n-gram does not exist in a first set of object names associated with a first vertical associated with first query 314. At step 630, social-networking system 160 may identify, for each n-gram that does not exist in the first set of object names, one or more variant-tokens based at least on the first bloom filter and the first set of object names. As an example and not by way of limitation, referencing FIG. 3, variant-tokens generation component 306 of spell-checker system 300 may identify, for each n-gram that does not exist in the first set of object names, one or more variant-tokens based at least on the first bloom filter and the first set of object names. At step 640, social-networking system 160 may generate one or more unique combinations of the n-grams and variant-tokens, where each unique combination includes a variant-token corresponding to each n-gram that does not exist in the first set of object names for the n-gram. As an example and not by way of limitation, referencing FIG. 3, phrase selection component 308 of spell-checker system 300 may generate one or more unique combinations of the n-grams and variant-tokens, where each unique combination includes the variant-token corresponding to each n-gram that does not exist in the first set of object names for the n-gram. At step 650, social-networking system 160 may calculate a confidence score for each unique combination based at least in part on the search query and whether the unique combination exists in the first set of object names. As an example and not by way of limitation, referencing FIG. 3, phrase confidence scoring component 312 of spell-checker system 300 may calculate a confidence score for each unique combination based at least in part on first query 314 and whether the unique combination exists in the first set of object names. At step 660, social-networking system 160 may identify objects matching each unique combination having a confidence score greater than a threshold confidence score. As an example and not by way of limitation, referencing FIG. 3, phrase confidence scoring component 312 of spell-checker system 300 may send one or more unique combinations whose confidence scores are greater than a threshold confidence score to social-networking system 160. Thereafter, social-networking system 160 may identify objects matching each unique combination received from phrase confidence scoring component 312. At step 670, social-networking system 160 may send, to the client device of the user, a search-results page responsive to the search query, the search-results page including one or more references to one or more of the identified objects, respectively. As an example and not by way of limitation, social-networking system 160 may send a search-results page responsive to first query 314 to the client device of the user. Furthermore, the search-results page may include one or more references to one or more of the identified objects, respectively. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for detecting and correcting particular misspelled search queries including the particular steps of the method of FIG. 6, this disclosure contemplates any suitable method for detecting and correcting any suitable misspelled search queries including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 160 and incorporate the retrieved social-networking functionality or context into the advertisement before serving the advertisement to a user. Examples of selecting and providing social-networkingsystem functionality or context with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action (or may be used as an input to calculate such a probability). In this way, a user's future actions may be predicted based on the user's prior actions, where the coefficient may be calculated at least in part on a history of the user's actions. This predicted probability represented by the coefficient may be different than the probabilities used to score search queries or reaction-cards discussed previously, may be used as a factor in calculating those probabilities, or may be directly used for those probabilities, as appropriate. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user. In particular embodiments, the coefficient of a user towards one or more objects may be based on the geographic proximity of the objects (e.g., to the user and/or each other) and the user's interactions with the objects. As an example and not by way of limitation, a pair of geo-locations that are sequentially visited by the user, such as for example, a restaurant and a nearby movie theater may be considered to be of more interest to each other than unrelated geo-locations.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 7:
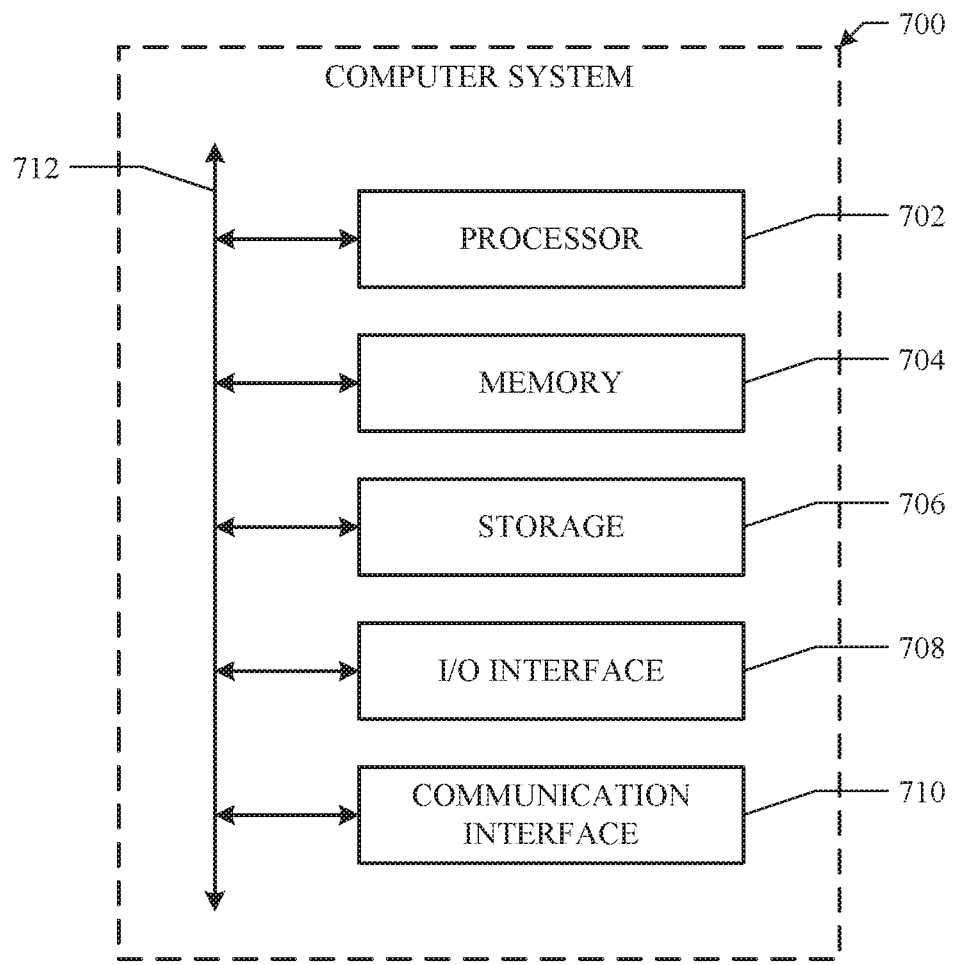
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:
   receiving, from a client system of a user, a search query comprising one or more n-grams;
   associating, by a segmentation component, each n-gram with one or more verticals, the associating of the n-gram being based on an analysis of the n-grams by one or more language models;
   determining, by a misspelled classifier component, for each n-gram, if a bloom filter for a vertical associated with the n-gram indicates, based on a plurality of sub-bloom filters of the bloom filter, the n-gram does exist or does not exist in a set of object names present in an index of objects in the vertical of the one or more verticals, each sub-bloom filter being associated with a subset of the set of object names and each sub-bloom filter indicating the n-gram does exist or does not exist in the respective subset of object names; and
   sending, to the client system of the user, an indication that one or more of the n-grams is misspelled if a bloom filter for a vertical of the one or more verticals associated with the respective n-gram indicates the n-gram does not exist in the set of object names present in the index of objects in the vertical.

2. The method of claim 1, wherein the one or more language models are selected based on social information associated with the user.

3. The method of claim 1, wherein each vertical of the one or more verticals is a data store storing objects of a particular object type.

4. The method of claim 1, wherein at least one vertical of the one or more verticals is a data store storing objects of two or more object types.

5. The method of claim 1, wherein each bloom filter and sub-bloom filter uses a hash function to determine whether the n-gram is a member of the set or subsets, respectively, of object names.

6. The method of claim 1, wherein a set of object names for a bloom filter or a subset of object names for a sub-bloom filter comprises object names associated with previous search queries or object names associated with corrected search queries.

7. The method of claim 1, wherein determining if the bloom filter for the vertical associated with the n-gram indicates the n-gram does exist or does not exist in the set of object names comprises determining, by the bloom filter, a likelihood that the n-gram is a member of the set of object names.

8. The method of claim 7, wherein determining, by the bloom filter, the likelihood that the n-gram is a member of the set of object names comprises determining, by each sub-bloom filter of the plurality of sub-bloom filters, a likelihood that the n-gram is a member of the subset of object names associated with the respective sub-bloom filter.

9. The method of claim 1, further comprising:
  identifying, for each n-gram that does not exist in the set of object names, one or more variant-tokens based at least on the bloom filter for the vertical associated with the n-gram and the set of object names present in the index of objects in the vertical; and
  generating one or more unique combinations of the n-grams of the search query and variant-tokens, wherein each unique combination comprises a variant-token corresponding to each n-gram that does not exist in a set of object names present in an index of objects in a vertical associated with the n-gram.

10. The method of claim 9, wherein identifying one or more variant-tokens is further based on a language model associated with the user.

11. The method of claim 9, wherein generating one or more unique combinations of the n-grams and variant-tokens comprises:
  calculating a token score for each identified variant-token based on at least a language model, an error-correction model, and a bloom filter comprising a plurality of sub-bloom filters, wherein the language model, the error-correction model, and the bloom filter are associated with the vertical associated with the n-gram corresponding to the identified variant-token, and wherein the token score indicates if the identified variant-token exists in the language model, error-correction model, and the set of object names present in the index of objects in the vertical; and
  wherein each variant-token used in a unique combination has a token score greater than a threshold token score.

12. The method of claim 9, wherein generating one or more unique combinations of the n-grams and variant-tokens comprises:
  calculating a combination score for each unique combination based on whether the bloom filter indicates, based on the plurality of sub-bloom filters of the bloom filter, the unique combination does exist or does not exist in the set of object names present in the index of objects in a vertical associated with an n-gram or variant-token of the unique combination; and
  selecting one or more of the unique combinations having a combination score greater than a threshold combination score.

13. The method of claim 12, wherein calculating the combination score for each unique combination is further based on one or more of:
  an indication of a valid grammar construct for the unique combination;
  an indication of whether the unique combination is associated with a database of previously identified lexicons associated with the vertical associated with the search query; or
  a measure of interactions with the unique combination by one or more users of an online social network.

14. The method of claim 9, further comprising:
  calculating a confidence score for each unique combination based at least in part on the search query and whether the bloom filter for a vertical associated with an n-gram or variant-token of each unique combination indicates the unique combination does exist or does not exist in a set of object names present in an index of objects in the vertical.

15. The method of claim 14, wherein calculating the confidence score for each unique combination is further based on whether the unique combination is relevant to a delivery of advertisements to the user of the online social network.

16. The method of claim 14, wherein calculating the confidence score for each unique combination is further based on a number of times the unique combination has appeared as a search query in the past.

17. The method of claim 14, further comprising:
  identifying objects matching each unique combination having a confidence score greater than a threshold confidence score; and
  sending, to the client system of the user, instructions for generating a search-results interface comprising one or more references to one or more of the identified objects, respectively.

18. One or more computer-readable non-transitory storage media embodying software that is operable when executed to:
  receive, from a client system of a user, a search query comprising one or more n-grams;
  associate, by a segmentation component, each n-gram with one or more verticals, the associating of the n-gram being based on an analysis of the n-grams by one or more language models;
  determine, by a misspelled classifier component, for each n-gram, if a bloom filter for a vertical associated with the n-gram indicates, based on a plurality of sub-bloom filters of the bloom filter, the n-gram does exist or does not exist in a set of object names present in an index of objects in the vertical of the one or more verticals, each sub-bloom filter being associated with a subset of the set of object names and each sub-bloom filter indicating the n-gram does exist or does not exist in the respective subset of object names; and
  send, to the client system of the user, an indication that one or more of the n-grams is misspelled if a bloom filter for a vertical of the one or more verticals associated with the respective n-gram indicates the n-gram does not exist in the set of object names present in the index of objects in the vertical.

19. A system comprising: one or more processors; and a memory coupled to the processors comprising instructions executable by the processors, the processors operable when executing the instructions to:
  receive, from a client system of a user, a search query comprising one or more n-grams;
  associate, by a segmentation component, each n-gram with one or more verticals, the associating of the n-gram being based on an analysis of the n-grams by one or more language models;

determine, by a misspelled classifier component, for each n-gram, if a bloom filter for a vertical associated with the n-gram indicates, based on a plurality of sub-bloom filters of the bloom filter, the n-gram does exist or does not exist in a set of object names present in an index of objects in the vertical of the one or more verticals, each sub-bloom filter being associated with a subset of the set of object names and each sub-bloom filter indicating the n-gram does exist or does not exist in the respective subset of object names; and send, to the client system of the user, an indication that one or more of the n-grams is misspelled if a bloom filter for a vertical of the one or more verticals associated with the respective n-gram indicates the n-gram does not exist in the set of object names present in the index of objects in the vertical.

* * * * *